(12) United States Patent
Rincon-Mora (10) Patent No.: US 6,369,555 B2
(45) Date of Patent: Apr. 9, 2002

(54) INTEGRATED LOW RIPPLE, HIGH FREQUENCY HYSTERETIC CONTROLLER FOR DC-DC CONVERTERS

(75) Inventor: Gabriel A. Rincon-Mora, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/750,427

(22) Filed: Dec. 28, 2000

Related U.S. Application Data
(60) Provisional application No. 60/204,319, filed on May 15, 2000.

(51) Int. Cl.[7] .............................. G05F 1/40; G05F 1/613
(52) U.S. Cl. ....................................... 323/282; 323/222
(58) Field of Search ................................. 323/282, 284, 323/285, 286, 287, 222; 363/21.01, 17, 16, 97, 89

(56) References Cited

U.S. PATENT DOCUMENTS

| | | | | |
|---|---|---|---|---|
| 4,929,882 A | * | 5/1990 | Szepesi | 323/222 |
| 5,359,280 A | * | 10/1994 | Canter et al. | 323/282 |
| 5,770,940 A | * | 6/1998 | Gder | 323/282 |

* cited by examiner

Primary Examiner—Rajnikant B. Patel

(74) Attorney, Agent, or Firm—W. Daniel Swayze, Jr.; W. James Brady; Frederick J. Telecky, Jr.

(57) ABSTRACT

The present invention relates to a hysteretic dc-dc converter circuit comprising a buck converter circuit having an output which forms an output of the converter circuit and a hysteretic comparator circuit having an output coupled to an input of the buck converter circuit and a first input coupled to the output of the converter circuit. The converter circuit also comprises a feedback circuit coupled between the output and a second input of the hysteretic comparator circuit. The feedback circuit generates a feedback ramp signal which is a function of an output of the hysteretic comparator circuit and which is out of phase with respect to the output of the converter circuit. The output feedback coupled with the ramp signal feedback provide for an increased hysteretic comparator trip frequency, thus increasing a natural frequency of the converter circuit without requiring an alteration of the hysteretic window. The present invention also relates to a method of increasing a natural frequency of a hysteretic dc-dc converter circuit. The method comprises initiating operation of a buck converter circuit and feeding back an output signal of the buck converter circuit to a comparator circuit. The method also comprises generating a feedback ramp signal which is out of phase with the output signal, feeding back the generated feedback ramp signal to the comparator circuit, and generating a comparator output signal based on the output signal and the generated feedback ramp signal. Such feedback results in an increase in a trip frequency of the comparator and thus increases a natural frequency of the converter circuit.

8 Claims, 6 Drawing Sheets

INTEGRATED LOW RIPPLE, HIGH FREQUENCY HYSTERETIC CONTROLLER FOR DC-DC CONVERTERS

This application claims benefit of provisional application Ser. No. 60/204,319 filed May 15, 2000.

TECHNICAL FIELD

The present invention relates generally to electrical circuits, and more particularly to a circuit and method of generating a hysteretic controller circuit having an increased natural frequency without requiring an alteration of the hysteresis window associated therewith.

BACKGROUND OF THE INVENTION

Switching power supply circuits are utilized in a number of different circuit applications. The three basic switching power supply topologies in common use are the buck, boost and buck-boost type power stages. These topologies are non-isolated, that is, the input and output voltages share a common ground. There are, however, isolated derivations of these non-isolated topologies. The differing topologies refer to how the switches, output inductor and output capacitor associated therewith are interconnected. Each topology has unique properties which include the steady-state voltage conversion ratios, the nature of the input and output currents, and the character of the output voltage ripple. Another important property is the frequency response of the duty cycle-to-output voltage transfer function.

The most common power stage topology is the buck power stage, sometimes called a buck converter or a step-down power stage (because the output is always less than the input). The input current for a buck power stage is said to be discontinuous or pulsating if a switching current pulses from zero or some negative value to some positive output current value every switching cycle. The output current for a buck power stage is said to be continuous or nonpulsating because the output current is supplied by an output inductor/capacitor combination. In the latter event, the inductor current never reaches a zero or negative value.

Figure 1A:
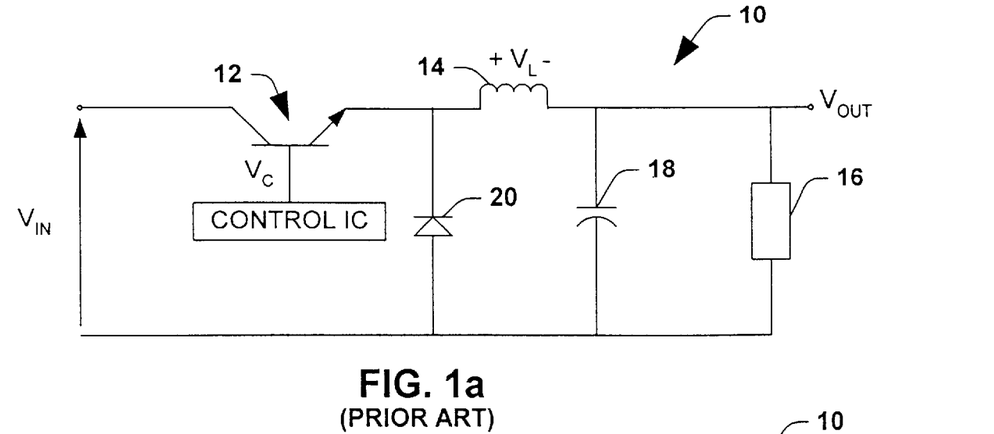
FIG. 1a is a circuit schematic diagram illustrating a conventional buck converter circuit which receives an input voltage signal and provides an output signal associated therewith.
Figure 1B:
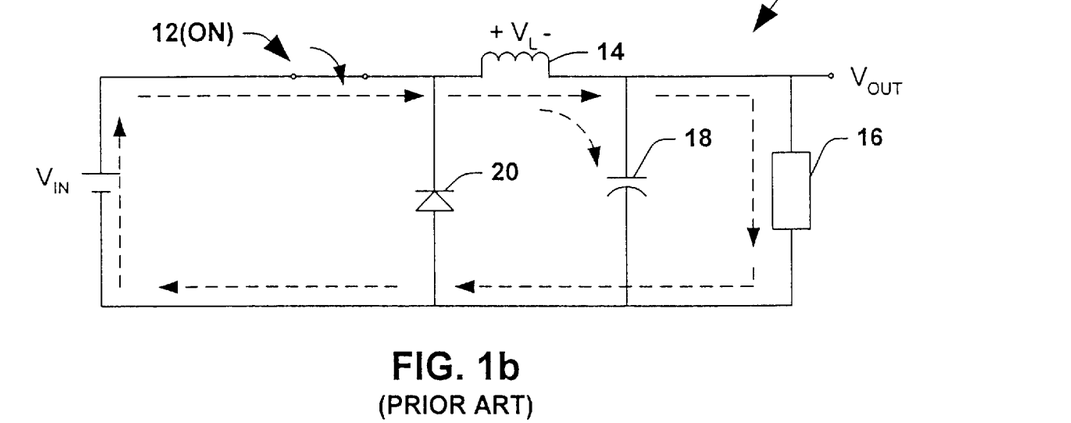
FIG. 1b is a circuit schematic diagram illustrating the conventional buck converter of FIG. 1a in an operational state where the driver or power switch is activated and behaving as a short circuit.

An exemplary basic buck converter circuit is illustrated in prior art FIG. 1a, and designated at reference numeral 10. When a power switch 12 is activated, the switch behaves like a closed circuit, as illustrated in prior art FIG. 1b, and the input voltage $V_{IN}$ is applied to an inductor 14, and power is delivered to an output load 16. The output load voltage is $V_{OUT}=V_{IN}-V_L$, wherein the $V_L$, the voltage across the inductor 14, is given by L(di/dt). The output voltage $V_{OUT}$ also is formed across a capacitor 18, thus the capacitor charges and the output voltage increases each time the switch 12 is closed.

Figure 1C:
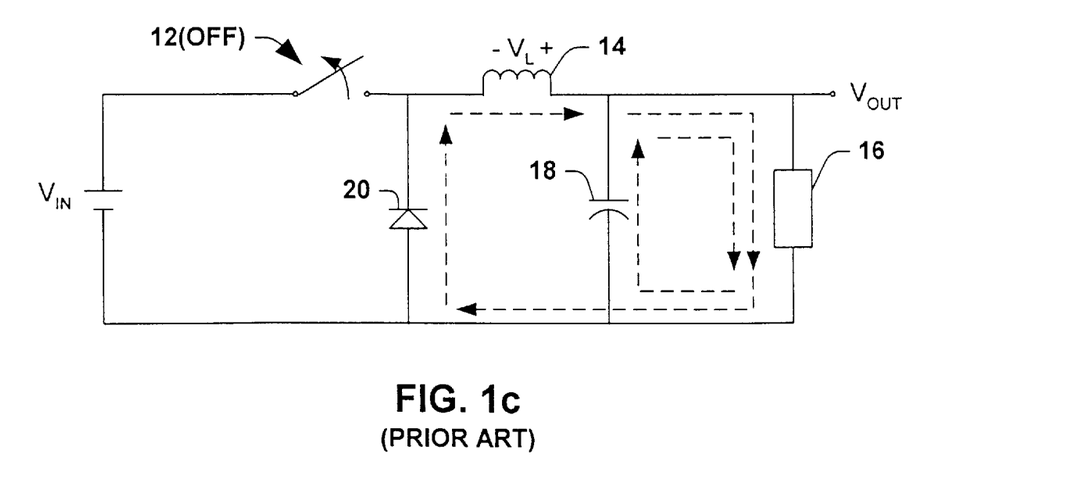
FIG. 1c is a circuit schematic diagram illustrating the conventional buck converter of FIG. 1a in an operational state where the driver or power switch is not activated and behaving as an open circuit.
Figure 2:
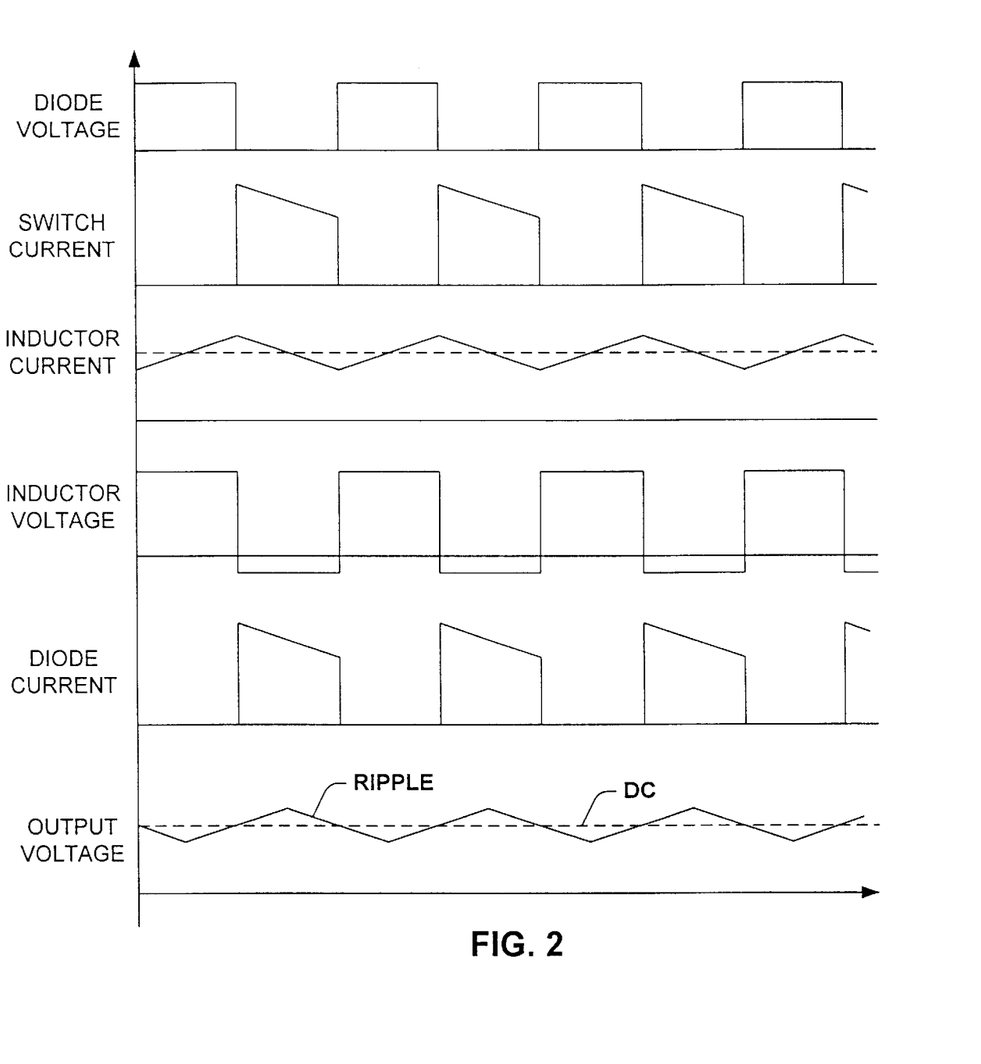
FIG. 2 is a series of waveform diagrams illustrating exemplary voltage and current waveforms at various nodes in the buck converter circuit of FIG. 1a over a period of time as the buck converter circuit progresses through a series of differing operational states.

When the switch 12 is deactivated, or turned off, the switch 12 behaves as an open circuit, as illustrated in prior art FIG. 1c, and the voltage across the inductor 14 reverses due to inductive flyback, thus making a circuit diode 20 forward biased. The circuit loop generated by the diode 20 allows the energy stored in the inductor 14 to be delivered to the output load 16, wherein the output current is smoothed by the capacitor 18. Typical waveforms for a buck converter are shown in FIG. 2. The power switch 12 is switched at a relatively high frequency (e.g., between about 20 KHz and about 300 KHz for most converters) to produce a chopped output voltage, however, the inductor 14 and capacitor 18 together operate as an LC filter to produce a relatively smooth output voltage having a DC component with a small ripple voltage overlying the DC value (see, e.g., output

2 voltage waveform of FIG. 2). The ripple voltage can be controlled by varying the duty cycle of the power switch control voltage.

Figure 3:
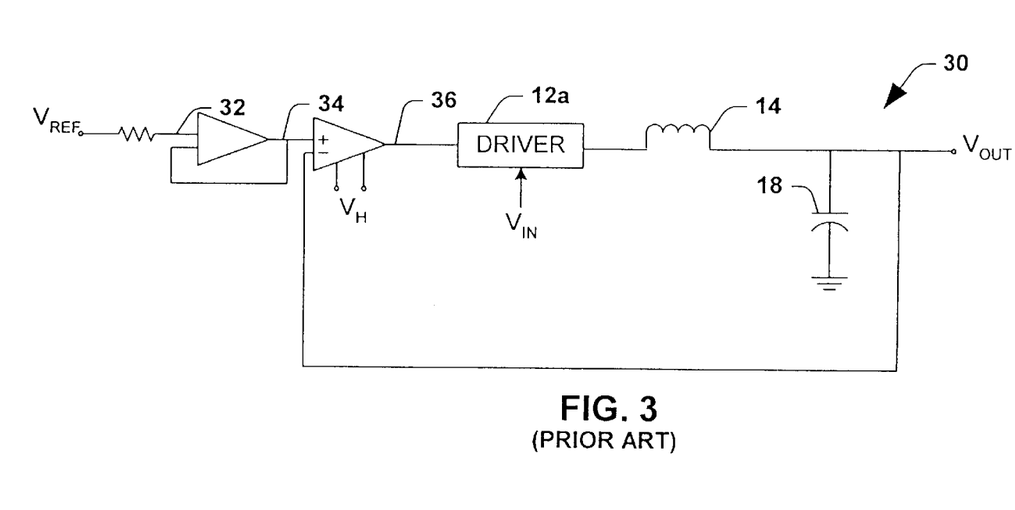
FIG. 3 is a circuit schematic diagram illustrating a conventional hysteretic dc-dc converter.
Figure 4:
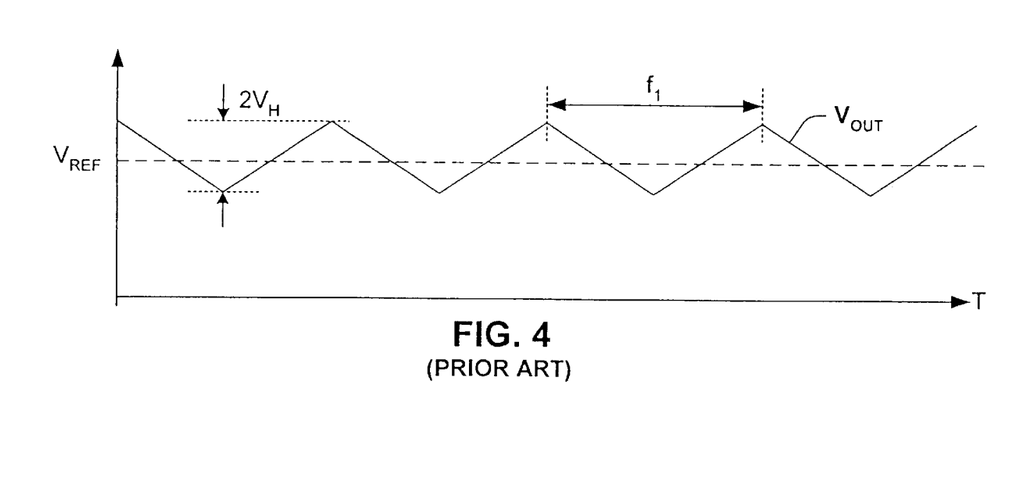
FIG. 4 is a waveform diagram illustrating the output voltage of the conventional hysteretic dc-dc converter of FIG. 3 and how the ripple voltage and the natural frequency associated therewith is a function of the hysteretic window of the comparator.

The base principle of operation in the above buck converter 10 is often utilized in hysteretic dc-dc converters, as illustrated in prior art FIG. 3, and designated at reference numeral 30. The circuit 30 is similar in various respects to the buck converter 10 of FIG. 1a and employs a unity gain buffer 32 serially coupled to an analog comparator circuit 34 having a hysteresis $V_H$. The comparator 34 compares the input reference voltage $V_{REF}$ to the circuit output voltage $V_{OUT}$ and provides an output signal at node 36 which is a function of the comparison and constitutes a generally square wave. An exemplary output voltage waveform for the circuit 30 is illustrated in FIG. 4. The hysteresis $V_H$ of the comparator 34 impacts the operation of the circuit 30 in the following manner. As the output $V_{OUT}$ falls below a voltage $V_{REF}-V_H$, the comparator 34 trips and the output thereof at node 36 goes from zero to the supply, ideally, which then is fed to the circuit output $V_{OUT}$ (wherein, $V_{OUT}$ is a function of the output of the comparator and the duty cycle of the driver). Similarly, as $V_{OUT}$ increases to a voltage $V_{OUT}+V_H$, the comparator 34 again trips and the output thereof at node 36 decreases to zero volts, which is fed to the circuit output $V_{OUT}$. Therefore the hysteresis $V_H$ of the comparator 34 dictates an amount of voltage ripple ($2*V_H$) about the target reference voltage $V_{REF}$, as illustrated in FIG. 4, and, in conjunction with the output capacitor dictates a natural frequency of the ripple voltage at the output $V_{OUT}$.

In many applications it is desirable to increase the natural frequency of the circuit 30 since a higher frequency allows use of a smaller capacitor, provides a smaller output ripple voltage, and provides a faster circuit response time. One conventional way of decreasing the natural frequency of a hysteretic dc-dc converter is to decrease the hysteretic window of the comparator 34. That is, instead of using a hysteretic value of $V_H$, a smaller value (e.g., $V_H-\Delta V_H$) is used. With a smaller hysteretic window, the comparator 34 trips earlier, thus increasing the natural frequency. While decreasing the hysteretic window in systems employing relatively large ripple voltages (e.g., on the order of about 100 mV or more) is a viable solution, such an approach is not practical in systems employing smaller ripple voltages (e.g., on the order of about 50 mV or less) because in such systems it becomes difficult to generate a well-controlled hysteresis window that is small and simultaneously insensitive to noise and random offset voltages. In other words, the accuracy requirements of the hysteretic comparator are generally more stringent for lower ripple voltages.

Therefore there is a need in the art for a circuit and method of providing an increased natural frequency in hysteretic circuits without altering the hysteretic window associated therewith.

SUMMARY OF THE INVENTION

According to the present invention, a circuit and method of increasing the natural frequency of a hysteretic circuit without altering the hysteretic window associated therewith is disclosed. Additionally, the invention is conducive to being easily integrated within an integrated circuit solution and is easily realizable in CMOS or BiCMOS type fabrication processes.

The present invention increases the natural frequency of a hysteretic dc-dc converter circuit without altering the signal-to-noise ratio of the defining hysteresis window. The present invention generates and couples an AC ramp signal to the input reference voltage. The AC ramp signal preferably is an inverted version of the feedback output voltage used as the sense node in conventional circuit. The AC ramp signal is utilized as an additional feedback mechanism and, together with the conventional sense node feedback, is used to generate a natural frequency which is greater than conventional circuits without requiring a modification of the hysteresis within the converter.

The AC ramp signal preferably maintains the duty cycle information of the converter circuit to assure proper operation. The duty cycle information is retained by utilizing the input voltage $V_{IN}$, which then is used to generate the ramp signal.

According to one aspect of the present invention, a hysteretic dc-dc converter circuit includes a feedback circuit in addition to the traditional feedback for generating a natural frequency that is greater than conventional circuits. The feedback circuit includes a level shifter circuit which generates an inverted signal with respect to the comparator output which contains the duty cycle information associated with the converter, and derives an inverted ramp signal associated therewith. The derived inverted ramp signal is superimposed over the input reference voltage and used with the output voltage to drive a hysteretic comparator circuit. Because the inputs are out of phase, the comparator is tripped more frequently despite no required change in the comparator hysteresis. The increased comparator trip frequency results in an increase in the natural frequency of the converter.

According to another aspect of the present invention, a method of increasing a natural frequency of a hysteretic dc-dc converter is disclosed. The method comprises initiating the operation of a buck converter circuit and feeding back an output signal of the buck converter circuit to a comparator circuit. A feedback ramp signal is then generated, which is out of phase with the output signal, and the feedback ramp signal is fed to the comparator circuit. The comparator circuit then generates an output signal based on the converter output signal and the generated feedback ramp signal, wherein the comparator circuit output signal exhibits an increased natural frequency without requiring an alteration of the hysteretic window of the comparator circuit.

To the accomplishment of the foregoing and related ends, the invention, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The present invention is directed to a circuit and method of increasing a natural frequency of a hysteretic dc-dc converter without requiring an alteration of a hysteretic window associated therewith. The invention increases the natural frequency of the converter by providing an additional feedback path back to the comparator. The additional feedback comprises a ramp signal which is related to the comparator output and which is out of phase therewith. The additional feedback along with an output sense node feedback increases a trip frequency of a comparator within the converter, thereby increasing a natural frequency of the converter. In addition, the present invention is capable of being integrated into an integrated circuit solution and is easily realizable in CMOS or BiCMOS type fabrication processes.

Figure 5:
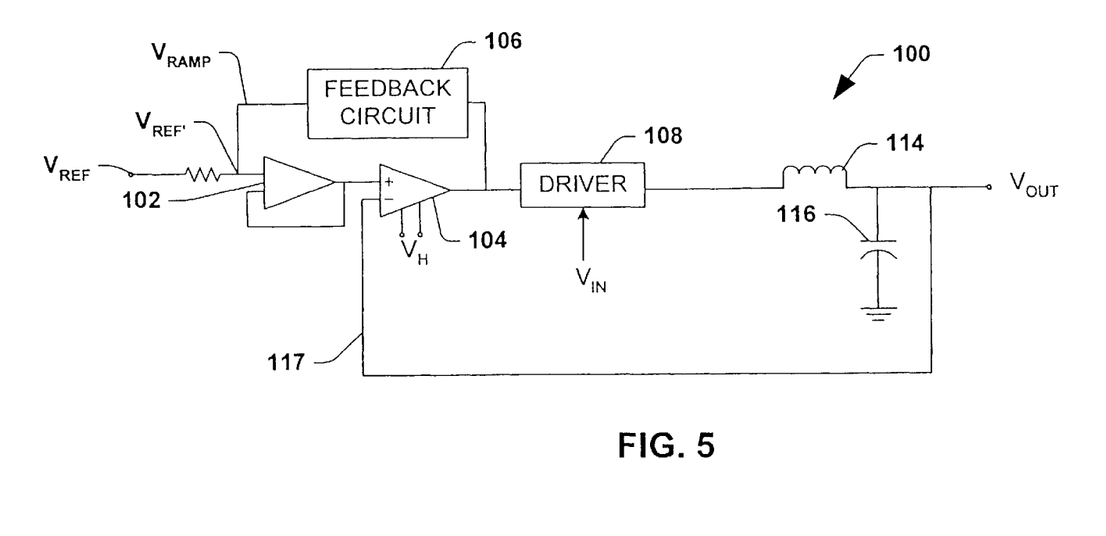
FIG. 5 is a circuit schematic diagram illustrating a hysteretic dc-dc converter containing a feedback circuit for increasing the natural frequency of the converter without decreasing the hysteretic window associated therewith according to the present invention.

Turning now to the figures, FIG. 5 is an exemplary circuit schematic diagram illustrating a low ripple, high frequency hysteretic dc-dc converter circuit 100 according to the present invention. The circuit 100 includes a buffer 102, such as a unity gain amplifier as shown, which feeds one input of a comparator circuit 104 having a hysteresis characteristic of $V_H$. According to the present invention, a comparator circuit comprises any type of circuitry which provides hysteretic trip points, for example, a traditional comparator circuit, Schmitt trigger, etc. A feedback circuit 106 is coupled to an output of the comparator 104 and provides a feedback signal $V_{RAMP}$ back to the buffer 102. The buffer 102 receives two input signals at its input node ($V_{REF'}$) and thus $V_{REF'}=V_{REF}+V_{RAMP}$, wherein $V_{REF}$ is an input reference voltage and $V_{RAMP}$ is a signal superimposed over $V_{REF}$ which will be discussed in greater detail below.

The output of the comparator circuit 104 is also coupled to a driver circuit 108, such as a power switch (e.g., a BJT or a MOSFET). The driver circuit 108 is also coupled to an LC filter 112 comprising an inductor 114 and a capacitor 116, respectively. The circuit output $V_{OUT}$ is taken across the capacitor 116, as shown in FIG. 5, and is also fed back to another comparator input as a sense node 117.

In operation, the circuit 100 provides for an increased natural frequency over conventional circuits without requiring a modification of the comparator hysteresis to alter the hysteresis window (e.g., $2*V_H$). The circuit 100 accomplishes the above operation by employing two forms of feedback to the comparator circuit 104. In particular, the output signal $V_{OUT}$ is fed back (sense node 117) to one terminal of the comparator in a conventional manner while another signal $V_{REF'}$, which is out of phase with $V_{OUT}$, is supplied to the other comparator input. Since the comparator input signals ($V_{REF'}$ and $V_{OUT}$) are out of phase the hysteresis trip point $V_H$ is reached causing the comparator circuit 104 to trip although neither input signal has reached a value of $V_{REF}\pm V_H$ (which was necessary to trip the comparator in prior art circuits). Therefore the natural frequency of the circuit 100, as dictated by the frequency at which the comparator circuit 104 trips ($f_2$), is increased over conventional circuits ($f_2>f_1$) although the hysteresis of the comparator (which defines the hysteresis window) is not required to be decreased. This feature is advantageous because this feature maintains the signal-to-noise (S/N) ratio, and thereby prevents inadvertent comparator trips.

Figure 6:
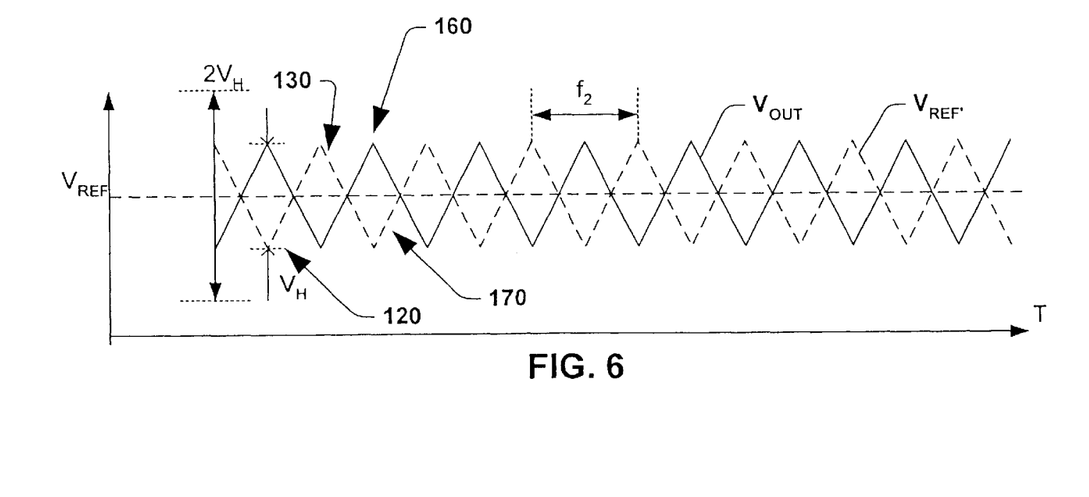
FIG. 6 is a waveform diagram illustrating circuit waveforms at various nodes of the hysteretic converter of FIG. 5 according to the present invention.

The manner in which the circuit 100 of FIG. 5 operates to achieve the above advantageous functionality may be further understood in conjunction with FIG. 6. As discussed previously, the comparator circuit 104 trips when the difference between the two input terminals exceeds the hysteresis value $V_H$. The manner in which the comparator circuit 104 trips (e.g., begins increasing or decreasing in a generally linear manner at its output) depends upon which of the input terminals is greater than the other. In conventional circuits (e.g., circuit 30 of FIG. 3), the positive input terminal of the comparator was fixed while the negative input terminal (the sense node 117) varied. Therefore the voltage swing previously necessary at the negative input terminal of the comparator to trip from one operating condition to another was $2*V_H$ (e.g., from $V_{REF}-V_H$ to $V_{REF}+V_H$, or vice-versa). Consequently, the hysteresis window ($2*V_H$) of the comparator dictated the natural frequency in conventional circuits.

The circuit 100 of the present invention feeds back the output voltage $V_{OUT}$ to one input terminal of the comparator 104 and, instead of providing a fixed input voltage at the other comparator input terminal (as in conventional circuits), provides a varying voltage ($V_{REF'}$) thereat which is out of phase with $V_{OUT}$. As a result, the voltage swing at the output $V_{OUT}$ does not dictate alone the trip frequency of the comparator 104, but instead the trip frequency is a function of both inputs. In addition, as will be described in greater detail later, the feedback voltage $V_{RAMP}$ provided by the feedback circuit 106 preferably is generated as an inverted version of $V_{OUT}$ to maximize the above-described benefit. Furthermore, the speed or slope of the ramp may be tuned to fit a variety of performance criteria, as may be desired.

Referring to FIG. 6, exemplary voltage waveforms that are input to the comparator circuit 104 are illustrated, that is, $V_{REF'}$ and $V_{OUT}$, respectively. According to the present example, the two signals are 180 degrees out of phase with one another such that as one signal is increasing, the other is decreasing. As illustrated in FIG. 6, at point 120, for example, the difference between the two signals is $V_H$, consequently the comparator circuit 104 trips. The output of the comparator 104 is delivered to the driver circuit 108 and is also coupled to the feedback circuit 106 which uses the signal to generate $V_{RAMP}$ which, when superimposed over $V_{REF}$ provides $V_{REF'}$ as illustrated in FIG. 6. According to a preferred aspect of the present invention, $V_{RAMP}$ is related to the duty cycle of the driver circuit 108 and contains therein duty cycle information so that the feedback circuit 106 does not affect adversely the circuit output voltage (since $V_{OUT}=V_{IN}*D$, wherein D is the duty cycle of the driver 108). In addition, any circuit of method of generating a feedback signal that out of phase with the output $V_{OUT}$ as discussed above may be utilized as the feedback circuit 106 and is contemplated as falling within the scope of the present invention.

It should also be noted that the effective ripple voltage, as shown in FIG. 6 has merely a peak-to-peak voltage of $V_H$, as opposed to $2*V_H$ of the prior art. It is to be appreciated that the ripple voltage further may be tuned by varying the phase of $V_{RAMP}$ with respect to $V_{OUT}$ or alternatively varying the amplitude of $V_{RAMP}$, as may be desired. Such variations are contemplated as falling within the scope of the present invention.

Figure 7:
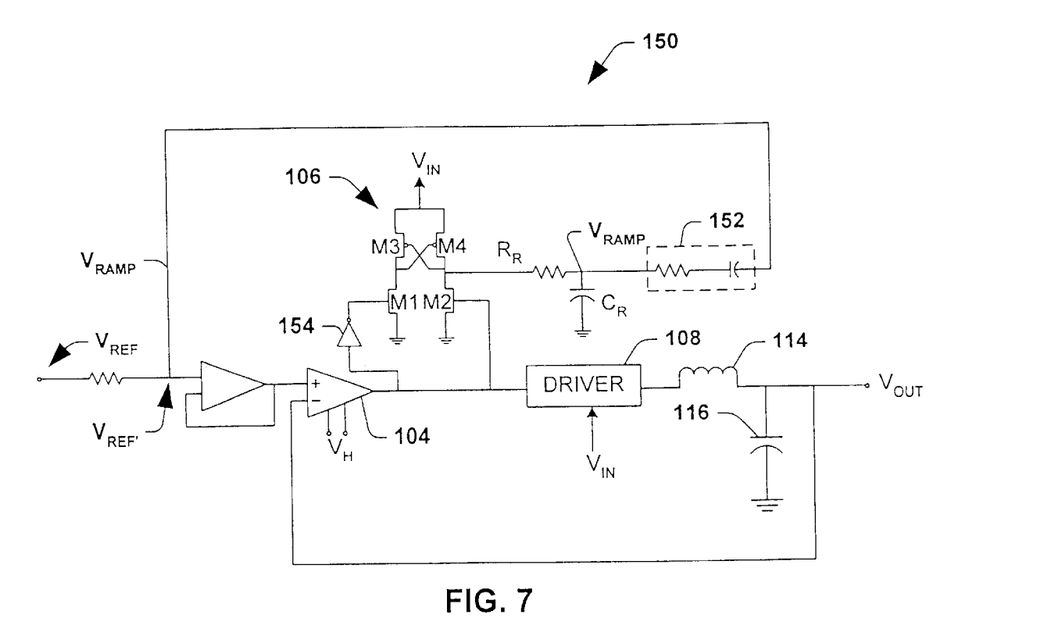
FIG. 7 is a circuit schematic diagram illustrating a hysteretic dc-dc converter containing a feedback circuit for increasing the natural frequency of the converter without decreasing the hysteretic window associated therewith according to the present invention.

A hysteretic dc-dc converter circuit employing a particular exemplary feedback circuit for generating feedback in accordance with the circuit of FIG. 5 is illustrated in FIG. 7. In FIG. 7, the feedback circuit 106 comprises a level shifter circuit 150 coupled to an RC transfer circuit 152. The level shifter circuit 150 includes two NMOS transistors M1 and M2 having gate terminals coupled to the output of the comparator 104 directly or through an inverter 154, respectively. The NMOS transistors M1 and M2 are coupled to two cross-coupled PMOS transistors M3 and M4 as illustrated. The supply voltage provided to the level shifter circuit 150 is preferably $V_{IN}$, which is the same input voltage as provided to the driver circuit 108, thereby advantageously maintaining the duty cycle information of the circuit 100 within the feedback circuit 106 as discussed above.

The exemplary circuit 100 of FIG. 7 operates in the following manner. The level shifter circuit 150 operates generally to receive an input voltage swing (e.g., 0–Vdd, the swing of the comparator output) and generates a different voltage swing (e.g., 0–$V_{IN}$) at its output, thus providing a voltage level which is "shifted" from its input level. When $V_{OUT}$ peaks, for example, at region 120 of FIG. 6, the difference between the comparator inputs is $V_H$, and the comparator 104 trips. These conditions cause the comparator output to increase. The rising voltage at the comparator output activates transistor M2 while causing M1 to be off. When M2 is activated, the gate of M3 is pulled low, thus turning M3 on. Since M2 is on and M4 is off, current conducts from the ramp capacitor and charge associated therewith begins to discharge from CR to ground through M2.

As the ramp capacitor $C_R$ continues to discharge, the voltage thereacross ($V_{RAMP}$) decreases as shown at region 130, thus causing the comparator input terminal (a superposition of $V_{RAMP}$ and $V_{REF}$) associated therewith to decrease. Therefore as $V_{OUT}$ increases, $V_{REF'}$ decreases due to the decrease in the ramp voltage $V_{RAMP}$. When the difference between the comparator input terminals again reaches $V_H$ (see, e.g., region 160 of FIG. 6), the comparator circuit 104 again trips and the comparator output begins to decrease. As the comparator output decreases, M2 turns off and M1 turns on. These actions cause M4 to turn on and M3 to turn off, respectively. When M4 turns on and M2 is off, current conducts from $V_{IN}$ through M4, $R_R$ and $C_R$ and thus the ramp capacitor $C_R$ begins to charge and increase in voltage. The voltage across the ramp capacitor $C_R$ is passed through the series RC elements 152 which collectively act as an AC coupling mechanism and the voltage across $C_R$ represents the ramp voltage $V_{RAMP}$ which is superimposed over $V_{REF}$ to form $V_{REF'}$. Consequently, $V_{RAMP}$ (and thus $V_{REF'}$) begins to increase as shown in region 170 of FIG. 6. In the above manner, $V_{RAMP}$ is superimposed on $V_{REF}$ to form $V_{REF'}$ which, in conjunction with $V_{OUT}$, provide two levels of feedback to the comparator circuit 104. Because one of the inputs is increasing while the other is decreasing, the comparator trip frequency (which dictates the natural frequency of the circuit 100) is increased over conventional circuits although no alteration of the comparator hysteresis is required.

Figure 8:
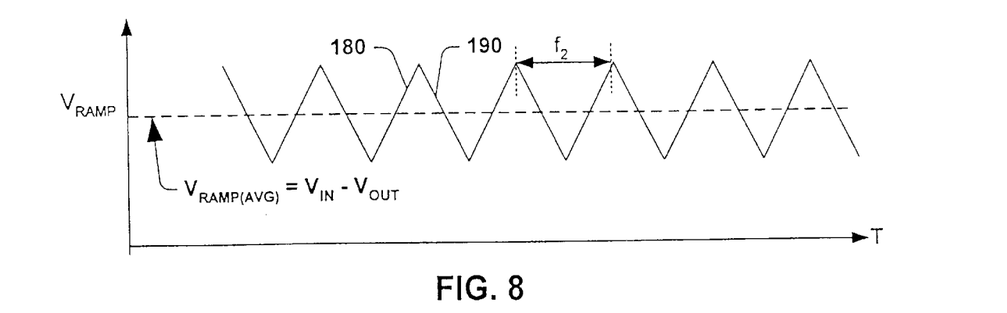
FIG. 8 is a waveform diagram illustrating a ramp voltage waveform in the feedback circuit of FIG. 5 according to the present invention.

The slope of the generated feedback signal $V_{RAMP}$ is a function of the feedback circuit 106 in the following exemplary manner, and will be discussed in conjunction with FIG. 8. As is well known in buck converter type circuits, neglecting circuit losses, the steady state average voltage across the inductor 114 is zero and the basic DC equation of the circuit is given by: $V_{OUT}/V_{IN}=D$, wherein D is the duty cycle of the driver circuit 108, and is defined by the conduction time divided by the switching period (dictated by the input voltage $V_{IN}$ of FIG. 7). Thus $D=t_{on}/T$, where $t_{on}+t_{off}=T$. The DC offset associated with the ramp voltage $V_{RAMP}$ in the feedback circuit is:

$$I=C(dv/dt)$$

For M2 on (capacitor discharge), $$I=V_{RAMP}/R_R=C_R(\Delta V/t_{on}).$$

For M4 on (capacitor charge), $$I=(V_{IN}-V_{RAMP})/R_R=C_R(\Delta V/t_{off}).$$

Combining the above equations, $$\Delta V=(V_{IN}-V_{RAMP})(t_{off})/R_RC_R=V_{RAMP}\cdot t_{on}/R_RC_R,$$

$$V_{RAMP(AVG)}=t_{off}V_{IN}/T=V_{IN}-V_{OUT}.$$

The slope of the ripple voltage in the feedback circuit 106 can also be determined by evaluating the ramp capacitor $C_R$. Since the current through the ramp capacitor $C_R$ is given by $I=C(dv/dt)$, the positive slope, for example, at region 180 in FIG. 8, is:

$$dv/dt=I/C=(V_{IN}-V_{RAMP})/R_RC_R=V_{OUT}/R_RC_R=D*V_{IN}/R_RC_R$$

Similarly, the negative slope of the ripple voltage, for example, at region 190, is given by:

$$dv/dt=I/C=V_R/R_RC_R=(V_{IN}-V_{OUT})/R_RC_R=V_{IN}(1-D)/R_RC_R$$

As can be seen from the above relationships, the ramp voltage can be varied in a variety of ways. More particularly, a designer can "speed up" the ramp and thereby increase the natural frequency of the circuit 100 by altering the values of $R_R$ and/or $C_R$, respectively. As can be seen in FIG. 6, by increasing the positive and/or negative slope of the ramp signal $V_{RAMP}$, the natural frequency of the circuit 100 is altered since it alters the trip frequency of the comparator circuit 104.

In addition, according to another alternative aspect of the present invention, $R_R$ and/or $C_R$ may be implemented as variable components, respectively, which allows a user to tune or "trim" the natural frequency at probe, for example, for various applications, as may be desired.

Figure 9:
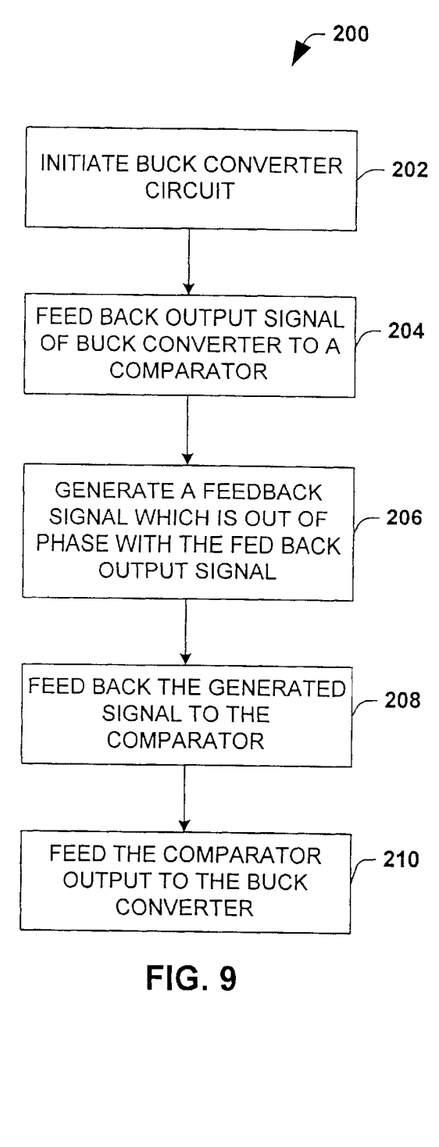
FIG. 9 is a flow chart diagram illustrating a method of increasing a natural frequency of a hysteretic dc-dc converter according to the present invention.

Although one aspect of the present invention relates to a circuit for increasing the natural frequency of a hysteretic dc-dc type converter, the present invention also contemplates a method for increasing such a natural frequency in such circuits. A method according to another aspect of the present invention is illustrated in FIG. 9 and designated at reference numeral 200. The method 200 includes initiating a buck converter circuit such as one of the buck converter circuits discussed supra at step 202. The buck converter generates an output signal in a manner as discussed previously, and the output signal is fed back to an input of a comparator circuit at step 204. A feedback ramp signal is then generated which is out of phase with the fed back output signal at step 206. As discussed above, with the two signals being out of phase, they can be used as inputs to the comparator at step 208 to increase a trip frequency of the comparator circuit without requiring an alteration of the hysteretic window associated with the comparator circuit. The comparator circuit output thus has an increased frequency which is fed as an input into the buck converter at step 210, thus increasing the natural frequency associated therewith.

Figure 10:
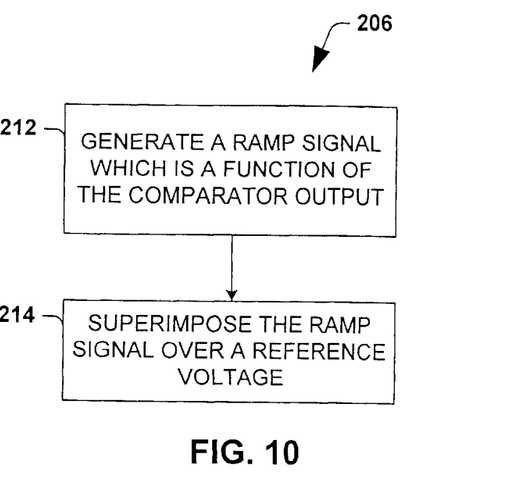
FIG. 10 is a flow chart diagram illustrating a method of generating a feedback signal which is out of phase with a fed back output signal according to the present invention.

According to an exemplary aspect of the present invention, the feedback signal generation step 210 may be performed in accordance with the method of FIG. 10. In FIG. 10, generating a feedback signal which is out of phase with the output signal is achieved by generating a ramp signal which is a function of the comparator output at step 212. Subsequently, the ramp signal is superimposed over a reference voltage for feeding to the comparator at step 208 of FIG. 9.

Figure 11:
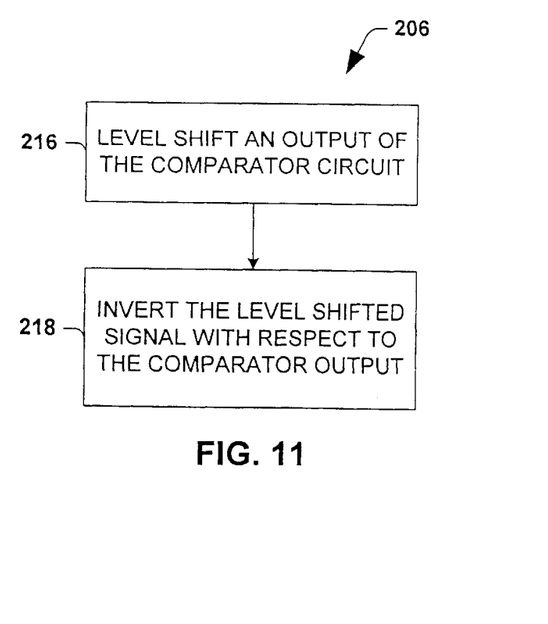
FIG. 11 is a flow chart diagram illustrating a method of generating a feedback signal which is out of phase with a fed back output signal according to the present invention.

Furthermore, such a step 210 may be achieved as illustrated in FIG. 11. The feedback signal may be generated at step 216 by taking the about of the comparator circuit and level shifting it, preferably using duty cycle information associated with the driver in the buck converter. Subsequently, the level shifted signal is inverted with respect to the comparator output to thus vary the phase relationship associated with the signals at step 218 for feeding backing to the comparator at step 208.

From the above, it can be seen that the natural frequency of a hysteretic converter can be increased without an alteration of a hysteretic window of an internal comparator circuit.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A hysteretic dc-dc converter circuit, comprising:
   a drive circuit;
   an LC filter circuit coupled to the drive circuit, wherein the LC filter has a converter circuit output terminal associated therewith;
   a hysteretic comparator circuit having an output coupled to the drive circuit,
   wherein a first input terminal of the hysteretic comparator circuit is coupled to the output terminal of the converter circuit; and
   a feedback circuit coupled between the input of the drive circuit and a second input terminal of the hysteretic comparator circuit,
   wherein the converter circuit input is also coupled to the second input terminal of the hysteretic comparator circuit, and wherein the feedback circuit provides a signal that, coupled with an input signal at the converter circuit input, is out of phase with an output signal at the first input terminal, and wherein a comparison of the signals at the first and second input terminals of the hysteretic comparator circuit results in a hysteretic comparator trip frequency which is greater than a trip frequency that would be dictated by a hysteresis window associated with the comparator circuit.

2. The converter circuit of claim 1, wherein the signal at the second terminal of the hysteretic comparator circuit is approximately an inverted representation of an output signal at the first terminal of the hysteretic comparator circuit, and wherein a phase relationship of the signals at the first and second input terminals of the hysteretic comparator cause the hysteretic comparator trip frequency to be approximately twice the trip frequency dictated by the hysteresis window of the comparator circuit.

3. The converter circuit of claim 1, wherein a natural frequency of the converter circuit is dictated by the trip frequency of the hysteretic comparator circuit.

4. The converter of claim 1, wherein the signal generated by the feedback circuit is a function of the duty cycle of the drive circuit.

5. The converter of claim 1, wherein the feedback circuit comprises a level shifter circuit operable to receive an input voltage swing associated with the output of the hysteretic comparator circuit and generate an output voltage swing associated with a drive circuit input voltage, and wherein a frequency of the output voltage swing is related to the trip frequency of the comparator circuit.

6. A hysteretic dc-dc converter circuit, comprising:
   a buck converter circuit having an output which forms an output of the converter circuit;
   a hysteretic comparator circuit having an output coupled to an input of the buck converter circuit and a first input coupled to the output of the converter circuit; and
   a feedback circuit coupled between the output and a second input of the hysteretic comparator circuit,
   wherein the feedback circuit generates a feedback ramp signal which is a function of an output of the hysteretic comparator circuit, and wherein the feedback ramp signal is out of phase with respect to the output of the converter circuit,
   wherein the feedback circuit comprises:
      a level shifter circuit; and
      a charge storage circuit coupled to the level shifter circuit,
   wherein the level shifter circuit transforms an output swing of the hysteretic comparator circuit to a voltage swing having a magnitude associated with an input voltage of the buck converter circuit and inverts a phase of the voltage swing with respect to the output swing of the hysteretic comparator circuit,
   wherein the level shifter circuit comprises:
      a first NMOS transistor having a drain terminal, a gate terminal, and a source terminal, wherein the source terminal is coupled to a circuit ground potential and the gate terminal is coupled to the output of the hysteretic comparator circuit through an inverter circuit;
      a second NMOS transistor having a drain terminal, a gate terminal, and a source terminal, wherein the source terminal is coupled to the circuit ground potential and the gate terminal is coupled to the output of the hysteretic comparator circuit;
      a first PMOS transistor having a source terminal coupled to a source voltage, a drain terminal coupled to the drain terminal of the first NMOS transistor and a gate terminal coupled to the drain terminal of the second NMOS transistor, wherein the source voltage comprises the input voltage of the buck converter circuit; and
      a second PMOS transistor having a source terminal coupled to the source voltage, a drain terminal coupled to the drain terminal of the second NMOS transistor, and a gate terminal coupled to the drain of the first NMOS transistor, wherein the drain terminal forms an output terminal of the level shifter circuit.

7. The converter circuit of claim 6, wherein the charge storage circuit comprises:
   a resistor having a first terminal coupled to the output terminal of the level shifter circuit; and
   a capacitor having a first terminal coupled to a second terminal of the resistor and the second input of the hysteretic comparator circuit, and a second terminal coupled to the circuit ground potential, wherein the rate of charge and discharge of the charge storage circuit is a function of an RC time constant associated with the resistor and the capacitor, respectively.

8. The converter circuit of claim 7, wherein the feedback circuit further comprises an AC coupling circuit coupled between the charge storage circuit and the second input of the hysteretic comparator circuit.

* * * * *